US006707374B1

(12) United States Patent
Zaharia

(10) Patent No.: US 6,707,374 B1
(45) Date of Patent: Mar. 16, 2004

(54) ELEVATOR ACCESS SECURITY

(75) Inventor: Vlad Zaharia, Rocky Hill, CT (US)

(73) Assignee: Otis Elevator Company, Farmington, CT (US)

(*) Notice: Subject to any disclaimer, the term of this patent is extended or adjusted under 35 U.S.C. 154(b) by 0 days.

(21) Appl. No.: 09/359,331

(22) Filed: Jul. 21, 1999

(51) Int. Cl.[7] .......................... G05B 19/00; G06F 7/00; G08B 21/00; H04B 1/20; H04L 9/14

(52) U.S. Cl. ...................... 340/5.31; 340/5.21; 187/392

(58) Field of Search ............................ 340/825.31, 3.1, 340/3.7, 3.9, 5.1, 5.2, 5.21, 5.27, 5.31, 5.33, 5.8, 5.81, 5.85, 5.86, 825.36, 825.49, 825.5; 348/143; 187/391, 392; 282/11

(56) References Cited

U.S. PATENT DOCUMENTS

| | | | | |
|---|---|---|---|---|
| 4,023,139 A | * 5/1977 | Samburg | 340/147 |
| 4,317,117 A | * 2/1982 | Chasek | 343/6 |
| 4,534,056 A | * 8/1985 | Feilchenfeld et al. | 381/42 |
| 4,874,063 A | * 10/1989 | Taylor | 187/130 |
| 4,979,594 A | * 12/1990 | Begle et al. | 187/121 |
| 5,150,099 A | * 9/1992 | Lienau | 340/552 |
| 5,201,906 A | * 4/1993 | Schwarz et al. | 109/8 |
| 5,543,778 A | * 8/1996 | Stouffer | 340/539 |
| 5,563,580 A | * 10/1996 | Stephens | 340/541 |
| 5,749,443 A | 5/1998 | Ramão | |
| 5,886,634 A | * 3/1999 | Muhme | 340/572 |
| 6,057,764 A | * 5/2000 | Williams | 340/572.1 |

FOREIGN PATENT DOCUMENTS

| | | | |
|---|---|---|---|
| EP | 0 528 188 A1 | 7/1992 | B66B/1/34 |
| EP | 0 832 839 A1 | 9/1997 | B66B/1/46 |

* cited by examiner

*Primary Examiner*—Brian Zimmerman
*Assistant Examiner*—Nam V Nguyen

(57) ABSTRACT

Directionally sensitive motion detectors at the entrances to elevator cars provide a running count of passenger population aboard the cars. Passengers wear portable devices that transmit personal IDs, and a check of IDs of passengers on the elevator along with the total passenger count will determine if each of the passengers exiting the elevator corresponds to an ID authorized to enter a particular floor of the building, or determine if each of the passengers aboard the car corresponds to an ID authorized to make a particular trip (the particular elevator at a particular time). Unauthorized exit may cause an alarm or other events. If any passenger does not have an ID authorized for a secure trip, an announcement urges the unauthorized passenger to leave for some period of time, following which an alarm is sounded and the elevator is prevented from moving. Pairs of motion detectors may provide directional sensitivity, or doppler motion detectors may be used.

14 Claims, 4 Drawing Sheets

ELEVATOR ACCESS SECURITY

TECHNICAL FIELD

This invention relates to monitoring authorization for persons gaining access to elevators and floor landings of a building by means of an elevator.

BACKGROUND ART

For security purposes, it has been known to prevent elevator start-up in the event that an unauthorized passenger has entered the elevator. Typically, passengers carry portable devices which emit identification numbers (IDs) usually using RF or IR electromagnetic radiation. In commonly owned, copending U.S. patent application Ser. No. 09/111, 355, filed Jun. 7, 1998, now abandoned an elevator system determines when a passenger has entered an elevator, other than the elevator assigned to respond to an automatically entered, destination call. However, no prior systems determine if a passenger, generally authorized to use the elevator, nonetheless exits on a floor for which the passenger is not authorized, or if a passenger without a portable device may be impermissibly on an elevator.

DISCLOSURE OF INVENTION

Objects of the invention include determining when a passenger, not authorized to do so, attempts to ride an elevator during a restricted trip, or exits an elevator onto a secure floor landing; and determining when passengers without IDs are on or exiting an elevator.

According to the present invention, directional motion detectors at the entrance to each elevator on a secure floor of a building, when an elevator is present with its doors open, count the number of passengers who enter and leave the elevator, to maintain a current passenger count; a poll of passengers wearing portable, ID-emitting devices, determines whether unknown passengers and which particular known passengers are in the elevator, by default determining if unauthorized passengers have left the elevator at a secure floor; a comparison of exiting passenger ID numbers with authorized passenger ID numbers will set an alarm if unauthorized or unknown persons have left the elevator at a secure floor, the doors on the floor may be locked, security personnel notified, and/or an alarm condition set, or sounded.

In further accord with the invention, passengers boarding and exiting an elevator are counted; a count of IDs sensed indicates if passengers without IDs are on board and IDs are compared with authorizations on secure elevator trips to restrict elevator passengers to those authorized for a particular, secure trip; otherwise the car is disabled.

In one embodiment, motion detectors on either side of the hoistway door entrance and on either side of the elevator door entrance determine the direction of passenger movement differentially, depending on which devices sense motion first. In a second embodiment of the invention, doppler motion detectors (of the type used in stores to prevent exiting through automatic entrance doors) determines the direction of passenger movement.

Other objects, features and advantages of the present invention will become more apparent in the light of the following detailed description of exemplary embodiments thereof, as illustrated in the accompanying drawing.

BEST MODE FOR CARRYING OUT THE INVENTION

Figure 1:
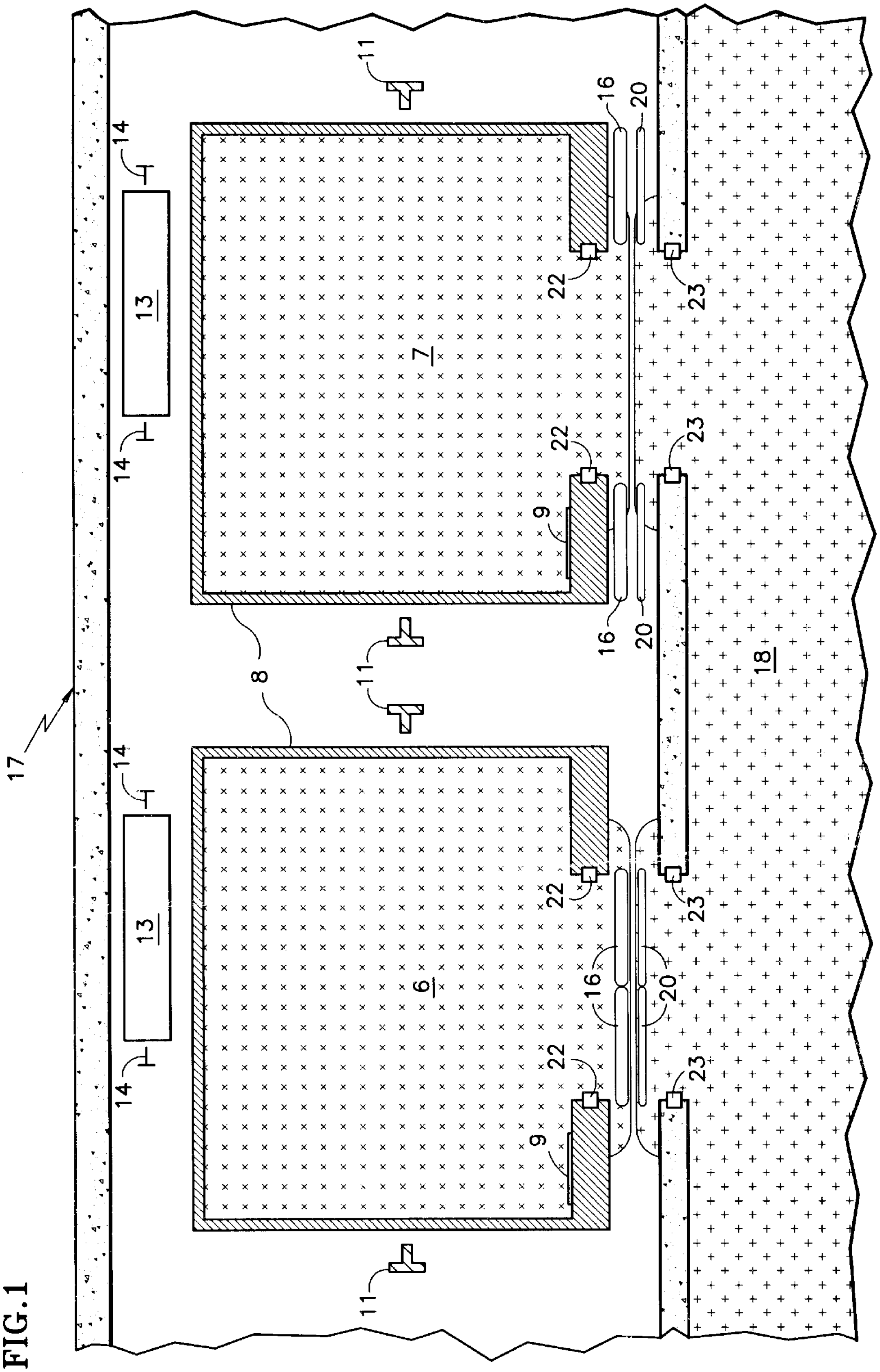
FIG. 1 is a stylistic, schematic, plan illustration of a pair of elevators utilizing pairs of motion detectors in accordance with the invention.

Referring to FIG. 1, a pair of elevators 6, 7 each include a cab 8 having a car operating panel 9, guide rails 11, counterweights 13 with guide rails 14, and doors 16. The elevators are disposed in a building 17 to serve floor landings 18, access to which is gained through hoistway doors 20. The description thus far is of a conventional elevator system.

For this invention, all authorized passengers carry conventional portable devices that transmit ID numbers assigned to the corresponding passenger. These may be passive RFIDs (such as are used in gasoline stations) or other RF or IR transmitters.

According to the invention, each elevator has a pair of motion detectors 22 which may be conventional, having a sensitivity pattern which causes them to sense only motion on the elevator car 6, 7, and not on an adjacent landing 18. Adjacent to the hoistway doors 20 on each landing 18, there is a pair of motion detectors 23 which may be conventional, having a sensitivity pattern that causes them to sense motion only on the landing 18, and not within one of the elevators 6, 7. As a passenger moves from the landing 18 into the elevator 7, for instance, the motion detectors 23 will provide a signal prior to the detectors 22, thus indicating that passenger movement is in the entering direction. As a passenger leaves the elevator 7, for instance, the motion detectors 22 will provide a signal prior to the motion detectors 23, thus indicating that passenger movement is in the exiting direction.

Figure 2:
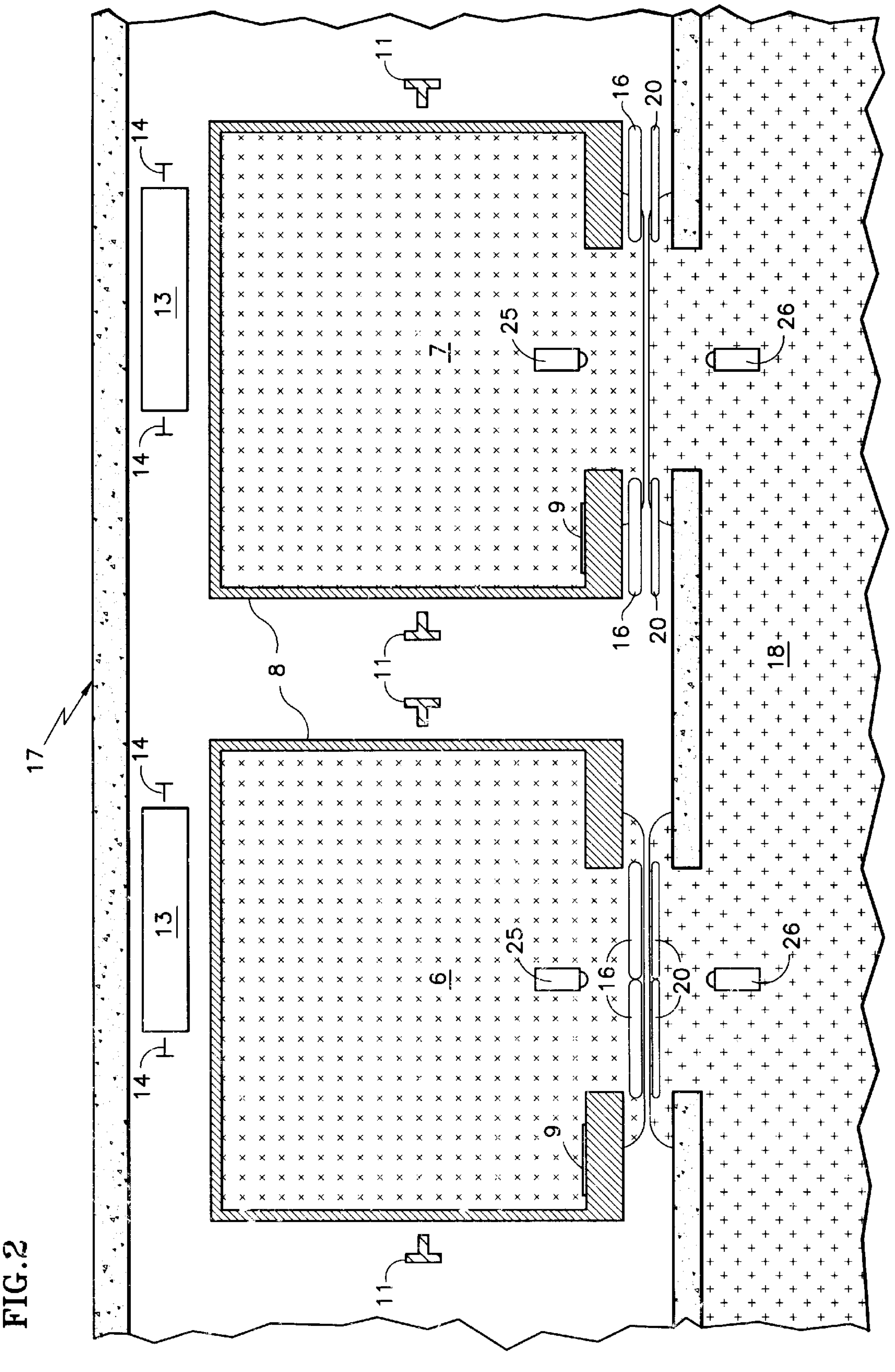
FIG. 2 is a stylistic, schematic, plan illustration of a pair of elevators utilizing doppler motion detectors in accordance with the invention.
Figure 3:
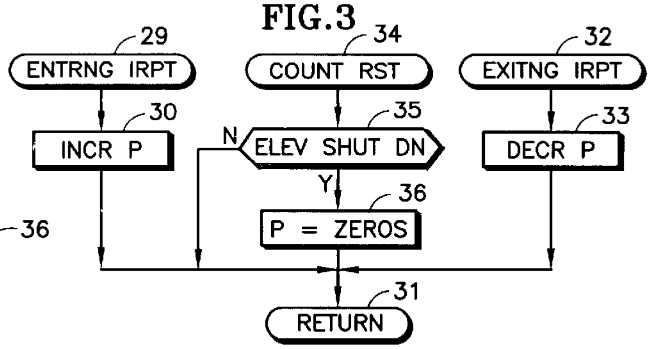
FIGS. 3–5 are illustrative, functional flow diagrams illustrating principles of the present invention.

Referring to FIG. 2, each of the elevators in another embodiment of the invention have a doppler motion detector 25 disposed in a suitable position, such as above the entrance, which may be conventional, and which may be mounted in any conventional fashion to suit the particular installation involved. Similarly, each entrance to an elevator from the elevator corridor 18 through hoistway doors 20 has a doppler motion detector 26 disposed in a suitable position, such as above the entrance, which may be conventional, and which may be mounted in any conventional fashion to suit the particular implementation of the invention. Passengers entering the elevator 7, for instance, will cause the detector 25 to provide a signal, whereas the detector 26 will provide no signal. Passengers leaving the elevator 7, for example, will cause the detector 26 to provide a signal, whereas the detector 25 will provide no signal. Thus a signal from the detector 25 indicates passenger motion in the entering direction, whereas a signal from the detector 26 indicates passenger motion in the exiting direction. The detectors 22, 23, 25, 26 may be used to keep a running count of passengers in the elevator for dispatching and other purposes, as well as to service the functions of the invention (FIG. 3). The detectors 22, 25 will be interconnected with a processor disposed within the building by means of the traveling cable, or such other communication medium as is used between the elevators and the building. The detectors 23, 26 will be connected by wire or in any other suitable fashion to the processor.

Referring to FIG. 3, if hardware associated with the detectors 22, 23 or 25 sense that there is passenger movement in the entering direction, an entering interrupt 29 will reach a step 30 to increment a P counter, which keeps a running count of the passenger population within the elevator car. And then other programming is reverted to through a return point 31. Similarly, if hardware associated with the detectors 22, 23 or 26 determine that there is passenger movement in the exiting direction, an exiting interrupt 32 will reach a step 33 to decrement the P counter. Periodically, the programming reaches a count reset routine through an entry point 34 and a test 35 determines if the elevator is shut down, or not. By that, is meant that the elevator is parked with its doors closed and its motor off. Whenever such is the case, an affirmative result of test 35 will reach a step 36 to reset the P counter to all zeroes, in order to assure that the elevator will start with a correct count when it resumes operation. When the elevator is not shut down, a negative result of test 35 reaches other programming through the return point 31.

Figure 4:
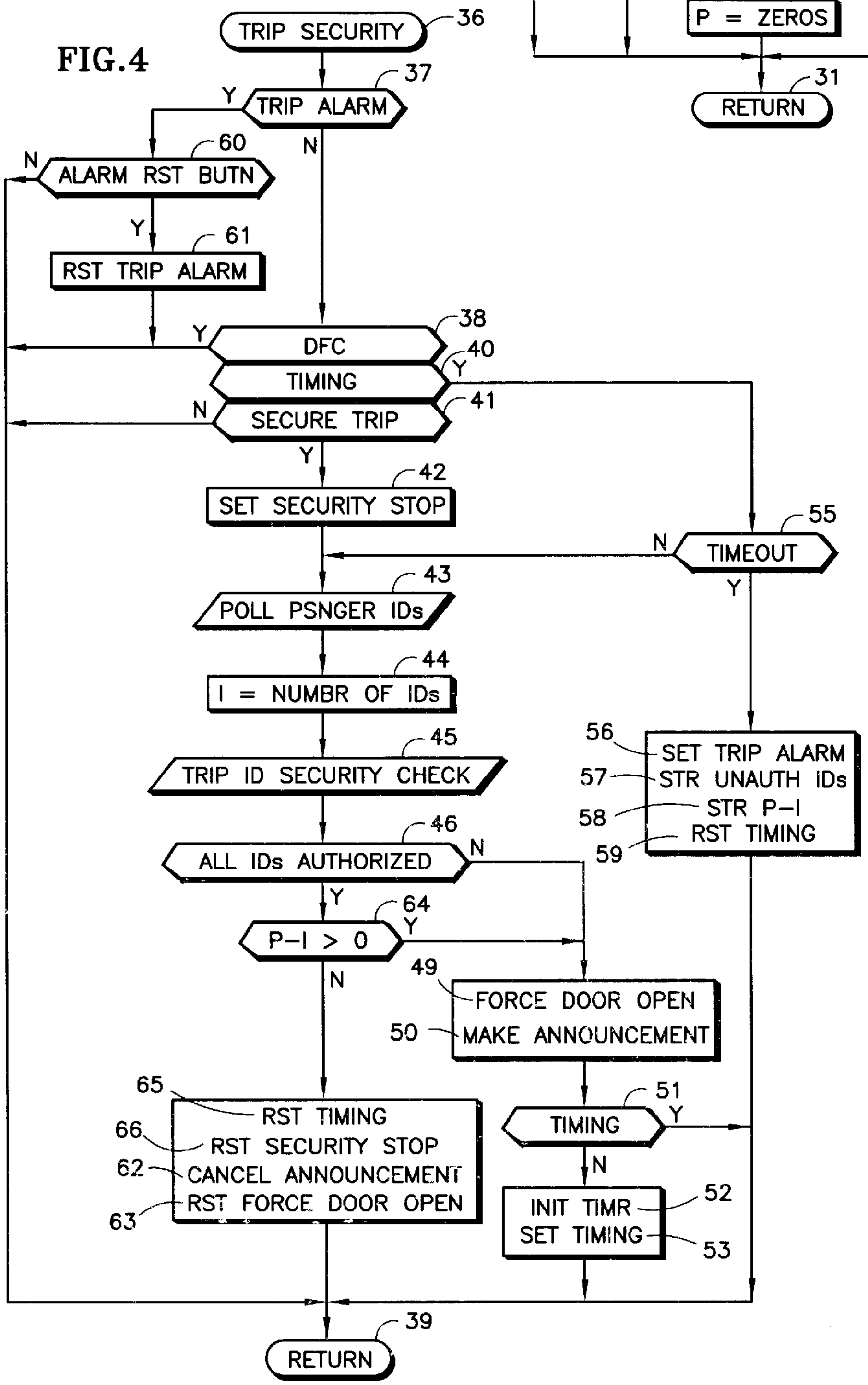

Referring to FIG. 4, an exemplary diagram of trip security functions which may be performed in order to practice the present invention includes entrance into a trip security subroutine through an entry point 36. A first test 37 determines if a trip alarm has been set. Initially, it will not, so a test 38 will determine if the doors of the elevator are fully closed or not. If so, the remainder of the routine of FIG. 4 is bypassed and other programming is reverted to through a return point 39. When the doors are at least partially open, a negative result of test 38 reaches a test 40 to see if a timing delay, described hereinafter, is underway or not. Initially it will not be, so a test 41 determines if this is a secure trip or not. If not, the remainder of FIG. 4 is bypassed through return point 39. But if it is a secure trip, the routine continues with a step 42 which sets a security stop flag that will interact with the safety chain of the elevator and absolutely prevent if from running, unless the flag is subsequently reset. This provides the security feature of not allowing the elevator to run unless all the passengers thereon are authorized for the particular secure trip involved. Then, passenger IDs are polled, in a subroutine 43, a step 44 sets a value, I, equal to the number of IDs that responded, and the IDs of the passengers are checked in a subroutine 45 to see if they are authorized to make the particular trip (which may be defined as the particular elevator at a particular time of day, or in some other fashion). If not all of the passengers are authorized for the trip, a negative result of a test 46 will reach a step 49 to force the door open (whether or not it is open), and a step 50 to make an announcement that there are unauthorized persons on the elevator, hopefully to cause someone who innocently entered the elevator by mistake to leave the elevator. Following the announcement, a test 51 determines if a timing interval is underway or not. Initially it will not be, so a negative result of test 51 reaches a step 52 to initiate the interval timer and a step 53 to set the timing latch to indicate that the timing interval is now underway. Then other programming is reached through the return point 39.

In the next pass through the routine of FIG. 4, results of tests 37 and 38 will be negative, and this time test 40 will be affirmative reaching a test 55 to determine if the time interval has timed out or not. If not, the passengers are once again polled and checked in the subroutines 43 and 45 and if there still are unauthorized persons on board, a negative result of test 46 causes step 50 to again make the announcement about unauthorized passengers. In a typical system, the announcement will take more time than it takes to repetitively reach the routine of FIG. 4 in the processor, so that the announcement process will simply be reinforced to repeat the announcement until it is cancelled, thereby rendering the step 50 to be redundant in subsequent passes. The test 51 will be affirmative this time, so that the steps 52 and 53 are bypassed as other programming is reached through the return point 39. This process may continue through an affirmative result of test 40, a negative result of test 55, a negative result of test 46 and an affirmative result of test 51, until either all unauthorized passengers leave the elevator car or the interval timer times out. Assuming the interval timer times out, a pass through the routine of FIG. 4 will find affirmative results of test 40 and test 55, causing a step 56 to set a trip alarm, which will leave the elevator with the security stop flag set, thus interrupting the safety chain and causing the elevator to remain where it is, while the alarm condition continues. Steps 57 and 58 may store the unauthorized IDs, and the difference between the number of passengers and the number of IDs, thus indicating why the alarm was set, and a step 59 resets the timing interval flag. Subsequent passes through the routine of FIG. 4 will pass through an affirmative result of test 37, and a negative result of a test 60 will cause all of the routine to be bypassed, preserving the status quo until security personnel take charge. When a trip alarm reset button is pressed, the alarm condition is reset in a step 61.

Assume that any unauthorized ID passenger has left the elevator car, in a subsequent pass through the routine of FIG. 4, an affirmative result of test 46 will reach a test 64 to see if the passenger count exceeds the number of IDs. If so, an affirmative result of test 64 triggers all the functions referred to hereinbefore with respect to a negative result of test 46. If no unknown persons are on board, a negative result of test 64 reaches a step 65 which resets the timing interval flag utilized in tests 40 and 51, which may be redundant if no unauthorized passengers had been present in the first place. A step 66 resets the security stop which allows the elevator car to move, and a step 62 will cancel the announcement, either to cause the announcement to cease if one is being made, or redundantly if no unauthorized passengers had been on board the elevator. A step 63 will reset the force door open flag, to indicate to the conventional door close routine that the security check has been successfully completed, and the door close routine may commence.

The functions illustrated in FIG. 4 will continue to be performed so long as the doors are not fully closed. Thus, should a passenger enter the elevator at the last minute, the step 42 will again set the security stop flag. And as described hereinbefore, the routine will attempt to cause the passenger to leave in a period of time, or will end up causing the alarm to be set with the security stop flag in place, immobilizing the elevator.

Figure 5:
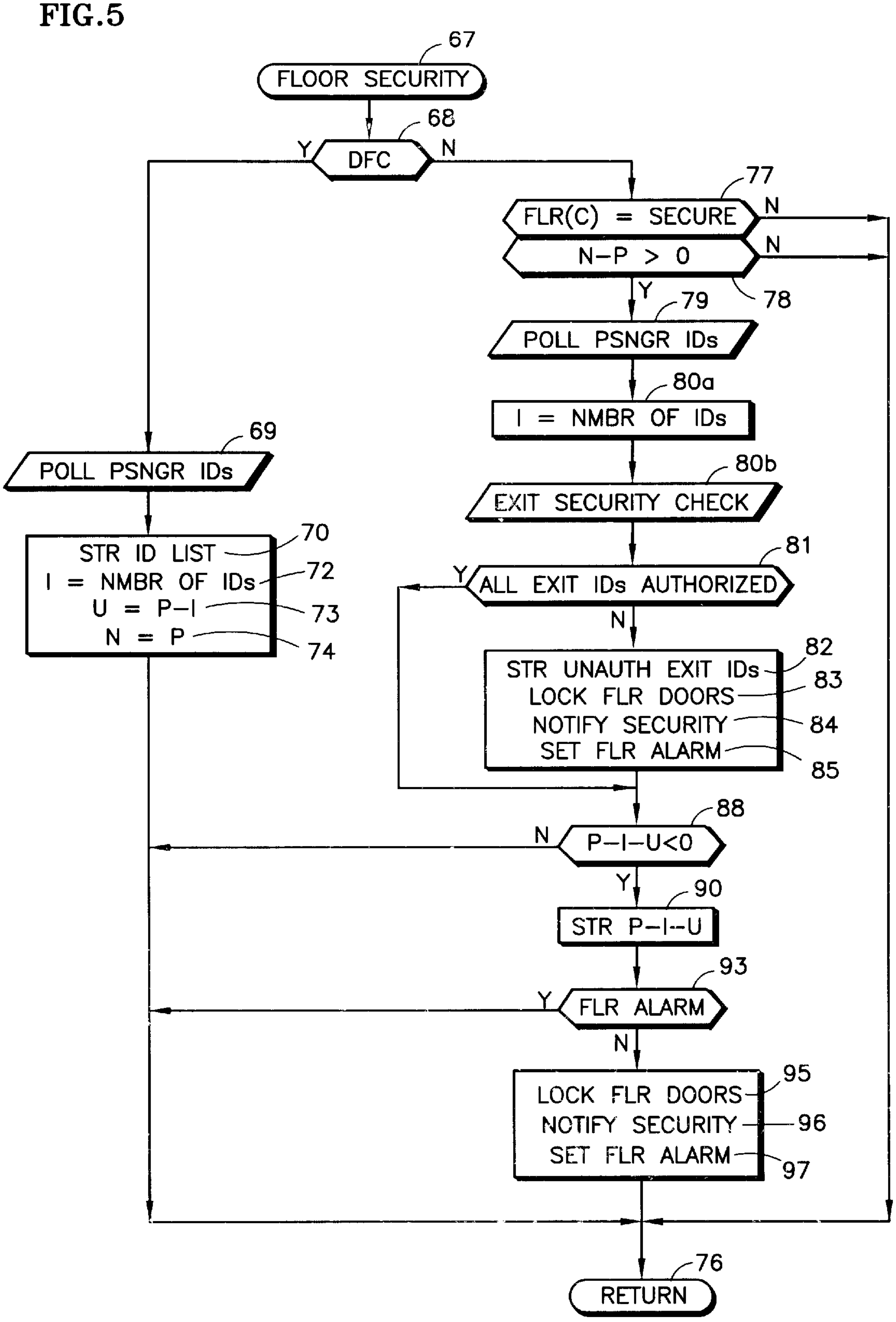

In FIG. 5, a floor security routine is reached through an entry point 67 and a first test 68 determines if the doors are fully closed or not. If they are, that means there can be no change in passenger population, so an affirmative result of test 68 reaches a subroutine 69 to poll the passenger IDs. Then a step 70 stores a list of the responding IDs, a step 72 sets a number, I, equal to the number of IDs determined in the poll, a step 73 sets a number, U, equal to P-I, so that U represents the number of unknown passengers in the car, and a step 74 sets a number, N, equal to the current population of passengers, P, in the car. Then other programming is reverted to through a return point 76.

In a subsequent pass through the routine of FIG. 5, if the doors are even partially open, a negative result of test 68 will reach a test 77 to determine if the floor of the car (C) is a secure floor or not. If not, all of the other functions in FIG. 5 are bypassed and other programming is reached through the return point 76. But if the floor is secure, a test 78 determines if the number of passengers, N, in the car at the time it reached the floor is larger than the current number of passengers, P, thereby indicating a decrement in the passenger count. If so, a subroutine 79 will poll all of the portable devices of the passengers within the car to determine their IDs, a step 80*a* sets I equal to the present number of IDs in the car, and a subroutine 80*a* will provide an exit security check, to compare the passengers presently in the elevator with a list of passengers made during the trip in subroutine 69 to determine whether the passengers with IDs who are now missing are all on the list of authorized passengers for the particular floor at which the elevator is stopped. Then a test 81 determines if all of the exited passengers were authorized; if not, a step 82 will store the IDs of those unauthorized persons who have exited. Then a step 83 will lock all doors on the floor, a step 84 will notify security and a step 85 will cause an alarm to be set. If desired, in order to not warn the unauthorized passengers that they have been detected, setting of the alarm may not include sounding an audible alarm, if desired.

On the other hand, if all of the passengers with IDs who exited were authorized, an affirmative result of test 81 will bypass steps 82–85. Whether or not any passengers with IDs made unauthorized exits onto the secure floor, a test also has to be made to see if any unknown passengers (not having IDs) may have exited onto the secure floor. Therefore, a test 88 determines if the present total number of passengers, P, minus the present number of passengers who bear IDs, I, minus the number of original unidentified passengers, U, is less than zero. This will occur only if the unidentified passenger count has decreased after the car reached the floor. If this count is not less than zero, a negative result of test 88 will bypass the remainder of the routine, through the return point 76. This is true whether or not the alarm may already be set. On the other hand, if an unidentified person has left the elevator on the secure floor, an affirmative result of test 88 reaches a step 90 to store the count of unidentified persons who have left the elevator car, and a test 83 determines if the floor alarm has been set yet or not. If it has, there is no point in performing the functions of steps 83–85 again so an affirmative result of test 93 bypasses the rest of the program through the return point 76. However, if no unauthorized passengers with IDs have been detected as leaving the elevator, the floor alarm will not have been set in step 85 so a negative result of step 93 causes a series of steps 95–97 to lock the doors, notify security, and set the floor alarm. If there has been no decrement in the passenger count, a negative result of test 78 bypasses the steps and tests 79–97. If the car is not stopped at a secure floor, all of the steps and tests 77–97 are bypassed by a negative result of test 77.

The description with respect to FIGS. 3–5 is illustrative, merely, there being a wide variety of manners in which to utilize the present invention.

The aforementioned patent application is incorporated herein by reference.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

I claim:

1. An elevator security system comprising:

directional motion detection apparatus disposed, with an elevator car parked at a landing with its door open, at the access between said landing and said car, said detection apparatus providing a continuous count of passenger population aboard said elevator car;

a plurality of portable identification number (ID) transmitting devices, each borne by a corresponding passenger, each for transmitting an ID signal in said elevator car to thereby identify the corresponding passenger; and signal processing means responsive, with said car at a secure floor, to said count indicating a decrement of said passenger population and to said ID signals for determining whether passengers who have left said car have IDs designated as authorized to enter the floor at which said car is stopped, and for performing one or more of locking doors on said floor, notifying security personnel, and setting an alarm condition unless all of said one or more passengers are so authorized.

2. A system according to claim 1 wherein:

said signal processing means comprises means for counting the number of said IDs among the passengers of said population prior to reaching said secure floor and for concurrently comparing it with said passenger count to determine the original number, if any, of unknown passengers aboard said car, and subsequently, with said car at said secure floor, determining if the present total passenger count, minus the present number of IDs, minus said original number of unknown passengers is less than zero, and if so, performing one or more of locking doors on said floor, notifying security personnel, and setting an alarm condition.

3. A system according to claim 1 wherein said signal processing means comprises means for sounding an alarm in the event that an unauthorized passenger exits said car at a secure floor.

4. A system according to claim 1 wherein said directional motion detection apparatus comprises at least one motion detector disposed on said car and at least one motion detector disposed on said landing.

5. A system according to claim 1 wherein said directional motion detection apparatus comprises a doppler motion detector.

6. A system according to claim 5 wherein said doppler motion detector is disposed on said car.

7. An elevator security system comprising:

directional motion detection apparatus disposed, with an elevator car parked at a landing with its door open, at the access between said landing and said car, said detection apparatus providing a continuous count of passenger population aboard said elevator car;

a plurality of portable identification number (ID) transmitting devices, each borne by a corresponding passenger, each for transmitting an ID signal in said elevator car to thereby identify the corresponding passenger; and signal processing means responsive to said count and to said ID signals for determining, when said car is at a landing with its doors not fully closed, if each waiting passenger in said car is authorized to make a trip in said car, for comparing the number of said ID signals to said count to thereby determine if unknown passengers are aboard said car, and for interrupting the safety chain of said elevator car, thereby to prevent it from running unless all of said waiting passengers are authorized to make said trip.

8. An elevator security system comprising:

directional motion detection apparatus disposed, with an elevator car parked at a landing with its door open, at the access between said landing and said car, said detection apparatus providing a continuous count of passenger population aboard said elevator car;

a plurality of portable identification number (ID) transmitting devices, each borne by a corresponding passenger, each for transmitting an ID signal in said elevator car to thereby identify the corresponding passenger; and signal processing means responsive, with said car at a secure floor, to said count indicating a decrement of said passenger population and to said ID signals for determining whether passengers who have left said car have IDs designated as authorized to enter the floor at which said car is stopped, and for performing one or more of locking doors on said floor, notifying security personnel, and setting an alarm condition unless all of said one or more passengers are so authorized, said signal processing means responsive to said count and to said ID signals for determining, when said car is at a landing with its doors not fully closed, if each waiting passenger in said car is authorized to make a trip in said car, for comparing the number of said ID signals to said count to thereby determine if unknown passengers are aboard said car, and for interrupting the safety chain of said elevator car, thereby to prevent it from running unless all of said waiting passengers are authorized to make said trip.

9. A method of securing an elevator landing, comprising:

(a) providing each regular passenger with a portable device which transmits an ID assigned to the corresponding passenger;

(b) determining the ID of each regular traveling passenger in an elevator car prior to reaching said landing;

(c) determining the ID of each remaining passenger in said car after a passenger has left said car at said landing;

(d) comparing said remaining passenger IDs with said IDs of said regular traveling passengers, thereby to determine the ID of any regular traveling passenger that left said car at said landing;

(e) sensing the motion of passengers entering and exiting from said car and providing a continuous count of the passenger population aboard said car;

(f) comparing the count of population aboard said car prior to reaching said landing with the count of population aboard said car when said car is at said landing to determine the number of passengers that have left said car at said landing; and (g) determining whether any said passenger that left said car at said landing is unauthorized to enter upon said landing, and if so, performing one or more of locking doors on said floor, notifying security personnel, and setting an alarm condition.

10. A method according to claim 9 wherein said step (9) includes sounding an alarm.

11. A system according to claim 9 wherein said step (e) is performed by apparatus comprising at least one motion detector disposed on said car and at least one motion detector disposed on said landing.

12. A system according to claim 9 wherein said directional motion detection apparatus comprises a doppler motion detector.

13. A method of providing elevator security, comprising:

(a) providing each regular passenger with a portable device which transmits an ID assigned to the corresponding passenger;

(b) determining the ID of each regular traveling passenger in an elevator car prior to reaching said landing;

(c) determining the ID of each remaining passenger in said car after a passenger has left said car at said landing;

(d) comparing said remaining passenger IDs with said IDs of said regular traveling passengers, thereby to determine the ID of any regular traveling passenger that left said car at said landing;

(e) sensing the motion of passengers entering and exiting from said car and providing a continuous count of the passenger population aboard said car;

(f) comparing the count of population aboard said car prior to reaching said landing with the count of population aboard said car when said car is at said landing to determine the number of passengers that have left said car at said landing;

(g) determining whether any said passenger that left said car at said landing is unauthorized to enter upon said landing, and if so, performing one or more of locking doors on said floor, notifying security personnel, and setting an alarm condition;

(h) comparing the count of population aboard said car prior to leaving a landing on a trip with the number of passengers aboard said car having IDs to determine if any unknown passengers are aboard said car;

(i) determining the ID of each passenger in an elevator car prior to leaving a landing on a trip; and (j) determining from said count and from said IDs if any passenger aboard said car is unauthorized to make said trip, and if so, preventing said car from running on said trip.

14. A method of elevator security, comprising:

(a) providing each regular passenger with a portable device which transmits an ID assigned to the corresponding passenger;

(b) determining the ID of each passenger in an elevator car prior to leaving a landing on a trip;

(c) comparing the count of population aboard said car prior to leaving a landing on a trip with the number of passengers aboard said car having IDs to determine if any unknown passengers are aboard said car; and (d) determining from said count and from said IDs if any passenger aboard said car is unauthorized to make said trip, and if so, preventing said car from running on said trip.

* * * * *